US012735570B2

(12) United States Patent
Yamamoto et al.

(10) Patent No.: US 12,735,570 B2
(45) **Date of Patent: *Sep. 15, 2026**

(54) MULTILAYER BODY AND ELECTRONIC COMPONENT FORMED OF SAME

(71) Applicant: DOW TORAY CO., LTD., Tokyo (JP)

(72) Inventors: Shinichi Yamamoto, Ichihara (JP); Ryosuke Yamazaki, Ichihara (JP); Shin Yoshida, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 1115 days.

This patent is subject to a terminal disclaimer.

(21) Appl. No.: 17/788,101

(22) PCT Filed: Dec. 28, 2020

(86) PCT No.: PCT/JP2020/049075

§ 371 (c)(1),
(2) Date: Jun. 22, 2022

(87) PCT Pub. No.: WO2021/132711

PCT Pub. Date: Jul. 1, 2021

(65) Prior Publication Data

US 2023/0044439 A1 Feb. 9, 2023

(30) Foreign Application Priority Data

Dec. 27, 2019 (JP) ................................ 2019-238728
Dec. 27, 2019 (JP) ................................ 2019-238730

(51) Int. Cl.

*C08L 83/04* (2006.01)
*B32B 7/06* (2019.01)

(Continued)

(52) U.S. Cl.

CPC ................ *C08L 83/04* (2013.01); *B32B 7/06* (2013.01); *B32B 7/12* (2013.01); *B32B 25/042* (2013.01);

(Continued)

(58) Field of Classification Search

CPC ........ B32B 37/1207; B32B 2037/1215; B32B 2037/243; B32B 2255/06; B32B 2255/10;

(Continued)

(56) References Cited

U.S. PATENT DOCUMENTS 4,293,671 A * 10/1981 Sasaki .................... C08L 83/04 528/31
4,919,843 A * 4/1990 Innertsberger ..... B01D 19/0409 528/33

(Continued)

FOREIGN PATENT DOCUMENTS

CN 106459419 A 2/2017
CN 107207859 A 9/2017

(Continued)

OTHER PUBLICATIONS

International Search Report (with English translation) for PCT/JP2020/049075 dated Mar. 16, 2021, 5 pages.

(Continued)

*Primary Examiner* — Kevin R Kruer

(74) *Attorney, Agent, or Firm* — Warner Norcross + Judd LLP

(57) ABSTRACT

A laminate body including a base material and a flat silicone sealing layer adhered thereto, generally without any voids, is provided. Also provided is a curable hot melt silicone composition layer with a particular curable hot melt silicone composition, providing a laminate body that does not readily cause stress on a substrate after the curable hot melt silicone composition is cured. A laminate body comprises a base (Continued)

material, and a curable hot melt silicone composition layer in contact with the base material. The curable hot melt silicone composition includes an organopolysiloxane resin containing siloxane units selected from a group containing T units or Q units making up at least 20 mol % or more of all siloxane units. The curable hot melt silicone composition generally has a melt viscosity as measured using a flow tester at a pressure of 2.5 MPa and at 100° C. of 5,000 Pa·s or less.

20 Claims, 2 Drawing Sheets

(51) Int. Cl.
*B32B 7/12* (2006.01)
*B32B 25/04* (2006.01)
*B32B 25/20* (2006.01)
*B32B 37/06* (2006.01)
*B32B 37/10* (2006.01)
*C09J 7/29* (2018.01)
*C09J 183/04* (2006.01)
*B32B 15/06* (2006.01)
*B32B 15/20* (2006.01)
*B32B 17/06* (2006.01)
*B32B 25/08* (2006.01)
*B32B 27/36* (2006.01)

(52) U.S. Cl.
CPC .............. *B32B 25/20* (2013.01); *B32B 37/06* (2013.01); *B32B 37/1018* (2013.01); *C09J 7/29* (2018.01); *C09J 183/04* (2013.01); *B32B 15/06* (2013.01); *B32B 15/20* (2013.01); *B32B 17/063* (2013.01); *B32B 25/08* (2013.01); *B32B 27/365* (2013.01); *B32B 2307/202* (2013.01); *B32B 2307/536* (2013.01); *B32B 2307/7265* (2013.01); *B32B 2307/748* (2013.01); *B32B 2457/00* (2013.01)

(58) Field of Classification Search
CPC ..... B32B 2457/08; B32B 15/09; B32B 18/00; B32B 7/022; B32B 15/01; H05K 1/03; H05K 2201/0162; H05K 2203/0278; C04B 37/00; C04B 2237/02; C04B 2237/343; C04B 2237/365; C04B 2237/366; H01L 21/56; H01L 23/296; H01L 23/145; H01L 23/3121; C08G 77/12; C08G 77/16; C08G 77/20
See application file for complete search history.

(56) References Cited

U.S. PATENT DOCUMENTS 5,153,238 A * 10/1992 Bilgrien .................. C08J 3/124 524/588
5,308,887 A * 5/1994 Ko .......................... C09J 4/00 526/279
5,696,209 A * 12/1997 King ..................... C09J 183/04 528/21
5,705,587 A * 1/1998 Hatanaka ............... C08L 83/04 528/901
5,705,592 A * 1/1998 Sejpka .................... C09G 1/16 524/588
5,750,581 A * 5/1998 Brennenstuhl ............ C08J 9/32 521/154
5,786,413 A * 7/1998 Weidner .................. C08J 3/122 524/588
5,844,060 A * 12/1998 Furuya .................. C08G 77/06 528/30
5,994,461 A * 11/1999 Nakamura ............. C08L 83/04 524/588
6,004,679 A * 12/1999 Mitchell ................ B32B 15/20 524/588
6,323,277 B1 * 11/2001 Petty ................... C08K 5/5425 528/33
12,173,202 B2 * 12/2024 Yamazaki ............ H01L 21/565
2001/0018482 A1 * 8/2001 Azechi .................... H01B 1/22 524/439
2002/0115811 A1 * 8/2002 Huang ................ C08G 77/045 528/24
2004/0044132 A1 * 3/2004 Kozakai ................. C08L 83/00 525/100
2004/0265599 A1 * 12/2004 Ushio ................... C09J 183/04 257/E23.125
2005/0037943 A1 * 2/2005 Woerner ............... C08G 77/38 510/511
2006/0073347 A1 * 4/2006 Morita ................ C08K 5/5419 428/447
2006/0264133 A1 * 11/2006 Krajewski ........... C09D 183/04 442/99
2006/0275617 A1 * 12/2006 Miyoshi ................. C08L 83/04 525/477
2007/0142574 A1 * 6/2007 Kodama ................ C08L 83/04 525/476
2007/0224800 A1 * 9/2007 Miyoshi ................. H01L 24/92 257/E23.12
2010/0104865 A1 * 4/2010 Mizuno ................. C09J 183/04 428/355 R
2010/0137529 A1 * 6/2010 Williams ............ C09D 5/1675 525/474
2011/0287267 A1 * 11/2011 Hori .......................... C09J 7/40 428/447
2013/0026682 A1 * 1/2013 Rist ........................ B29C 33/06 250/492.1
2013/0168727 A1 * 7/2013 Horstman ........... H10H 20/854 524/588
2013/0331499 A1 * 12/2013 Hamamoto ............ C08L 83/04 524/500
2014/0060324 A1 * 3/2014 Ahn .................... B01D 71/701 96/10
2014/0154626 A1 * 6/2014 Bujalski .............. C09D 183/06 430/280.1
2014/0343202 A1 * 11/2014 Dinkar ................... C07F 15/02 524/588
2015/0218427 A1 8/2015 Ono et al.
2015/0235872 A1 * 8/2015 Yoshida ................. C08L 83/04 264/272.17
2015/0376344 A1 * 12/2015 Dent ..................... C08G 77/08 252/301.36
2016/0001541 A1 * 1/2016 Rummel ................. C08J 5/243 156/307.3
2016/0185912 A1 * 6/2016 Mizunashi ............. C08L 83/00 428/220
2017/0051115 A1 * 2/2017 Bok ....................... C08L 83/04
2017/0190911 A1 * 7/2017 Iimura ................... C08L 83/04
2017/0247590 A1 * 8/2017 Zheng .................... C08L 83/04
2017/0253700 A1 9/2017 Dogen et al.
2017/0355804 A1 * 12/2017 Fujisawa .............. C08F 299/08
2018/0094178 A1 * 4/2018 Yamamoto ........... C09D 183/12
2018/0155512 A1 * 6/2018 Kusunoki .............. C08L 83/04
2018/0208816 A1 7/2018 Yamazaki et al.
2019/0040204 A1 * 2/2019 Beyer .................... C08G 77/12
2019/0055420 A1 * 2/2019 Beyer ...................... C08K 5/56
2019/0100650 A1 * 4/2019 Bhagwagar ............. C09K 5/14
2019/0106571 A1 * 4/2019 Nakagawa ............. C08L 83/04
2019/0177488 A1 * 6/2019 Yamazaki ............... C08K 3/36
2019/0315926 A1 * 10/2019 Hayashi ................ C08G 77/80
2020/0115595 A1 * 4/2020 Tsuchida ................ C08L 83/04
2020/0123417 A1 * 4/2020 Kodama .................. B32B 7/12
2020/0216671 A1 7/2020 Matsuzaki et al.
2020/0220055 A1 7/2020 Kitaura et al.
2020/0224069 A1 * 7/2020 Itoh .......................... B32B 5/26
2020/0239687 A1 * 7/2020 Bekemeier ............. C08L 83/04
2020/0270454 A1 * 8/2020 Jia ........................ C08K 5/5435
2020/0291187 A1 * 9/2020 Beukema .............. C08G 77/06
2020/0308412 A1 * 10/2020 Schneider ............ C01B 33/193

(56) References Cited

U.S. PATENT DOCUMENTS

2020/0373457 A1 11/2020 Kitaura et al.
2021/0087396 A1* 3/2021 Johnson .................. C08L 83/04
2021/0147635 A1* 5/2021 Jang ........................ C08L 83/04
2021/0179783 A1* 6/2021 Yoshitake ................ G02B 1/04
2021/0179784 A1* 6/2021 Yoshitake .............. C08G 77/14
2021/0179849 A1* 6/2021 Yoshitake .............. G02B 7/025
2021/0238416 A1* 8/2021 Ostendorf ................ C08K 9/06
2021/0238417 A1* 8/2021 Nie ...................... C08K 5/5419
2021/0246312 A1* 8/2021 Thiria ....................... B32B 7/09
2021/0253858 A1* 8/2021 Yu .......................... C08G 77/20
2021/0299394 A1* 9/2021 Masterton ........... A61M 16/161
2022/0017547 A1* 1/2022 Jang ...................... C07F 9/5337
2022/0017701 A1* 1/2022 Fukui ..................... H10N 30/50
2022/0048230 A1* 2/2022 Imaizumi ............... C08G 77/70
2022/0049100 A1* 2/2022 Yamazaki .............. C08G 77/12
2022/0064447 A1* 3/2022 Yamazaki .............. C08G 77/80
2022/0112375 A1* 4/2022 Dent ....................... C08L 83/04
2022/0145020 A1* 5/2022 Liu .......................... C08J 3/243
2022/0169856 A1* 6/2022 Wang ...................... C08L 27/18
2022/0169894 A1* 6/2022 Yamazaki .............. C08G 77/70
2022/0186099 A1* 6/2022 Yamazaki ................. B32B 7/06
2022/0195121 A1* 6/2022 Wheeler .............. C09D 183/04
2022/0195269 A1* 6/2022 Yamazaki ............... B29C 43/24
2022/0204770 A1* 6/2022 Vanecek ............. C09D 183/06
2022/0204771 A1* 6/2022 Horie ..................... C08G 77/12
2022/0204827 A1* 6/2022 Deng ..................... C08G 77/46
2022/0234335 A1* 7/2022 Ishihara ................ B32B 27/283
2022/0235181 A1* 7/2022 Amako .................. C08G 77/44
2022/0235226 A1* 7/2022 Amako .................... C09D 7/61
2022/0340756 A1* 10/2022 Nishijima ............... B32B 27/10
2022/0356370 A1* 11/2022 Wang ....................... C08K 5/56
2022/0372304 A1* 11/2022 Fisher .................... C09D 5/004
2023/0022605 A1* 1/2023 Zeng ...................... C08K 3/013
2023/0024520 A1* 1/2023 Peng ...................... C09J 183/04
2023/0024747 A1* 1/2023 Wang ....................... C08K 9/06
2023/0036696 A1* 2/2023 Sarkar ..................... C08L 83/04
2023/0044439 A1* 2/2023 Yamamoto ............ H01L 23/296
2023/0045626 A1* 2/2023 Fedurco ................... C08K 3/36
2023/0046737 A1* 2/2023 Chon ...................... C08L 83/06
2023/0061734 A1* 3/2023 Fedurco .................. B29C 33/58
2023/0094559 A1* 3/2023 Desroches ............. C08G 77/08
523/209
2023/0102289 A1* 3/2023 Fang ........................ C08K 3/22
528/14
2023/0137947 A1* 5/2023 Yamazaki .................. C08J 5/18
428/220
2023/0295432 A1* 9/2023 Fukui ...................... C08L 83/08
524/588
2023/0303891 A1* 9/2023 Santos ................. C09D 183/04
2024/0043623 A1* 2/2024 Yamazaki ............... C08L 83/04
2024/0052106 A1* 2/2024 Yamazaki ............... B32B 25/20
2024/0228706 A1* 7/2024 Otsuka ..................... C08K 3/22
2024/0400829 A1* 12/2024 Marchand ............... C08L 83/04
2024/0400831 A1* 12/2024 Gutacker ............... C08K 5/548
2025/0034368 A1* 1/2025 Rosenmayer ............ C08K 5/09
2025/0051571 A1* 2/2025 Yamazaki .................. C08J 5/18

FOREIGN PATENT DOCUMENTS

EP 3699236 A1 8/2020
JP 4607429 B2 1/2011
JP 2016124967 A 7/2016
JP 2014237834 A 12/2018
WO 2004086492 A1 10/2004
WO 2016035285 A1 3/2016
WO 2018235492 A1 12/2018
WO 2019049791 A1 3/2019
WO 2019049794 A1 3/2019
WO 2019059351 A1 3/2019
WO 2019078140 A1 4/2019

OTHER PUBLICATIONS

Machine assisted English translation of JP2016124967 obtained from https://patents.google.com/patent on Nov. 11, 2022, 18 pages.
Machine assisted English translation of WO2018235492 obtained from https://patents.google.com/patent on Nov. 11, 2022, 21 pages.

* cited by examiner

[FIG. 1]
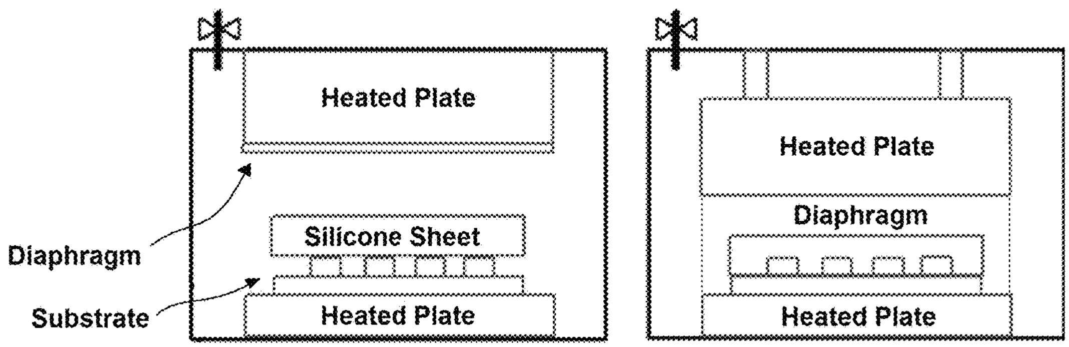
[FIG. 2]
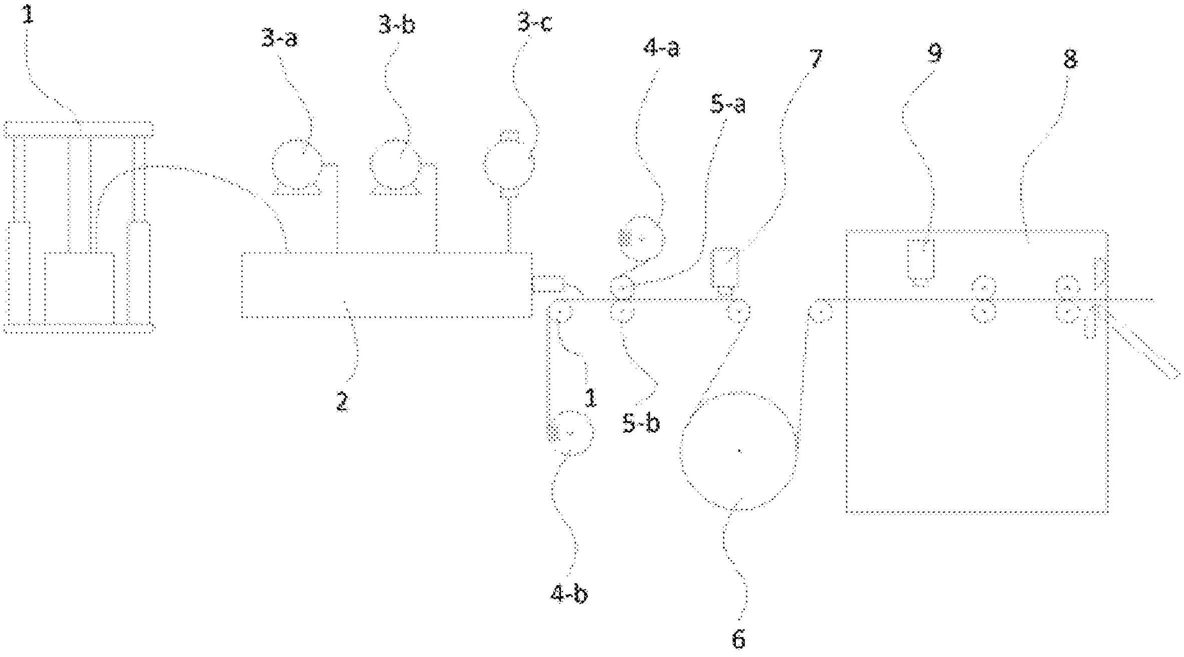

[FIG. 3]
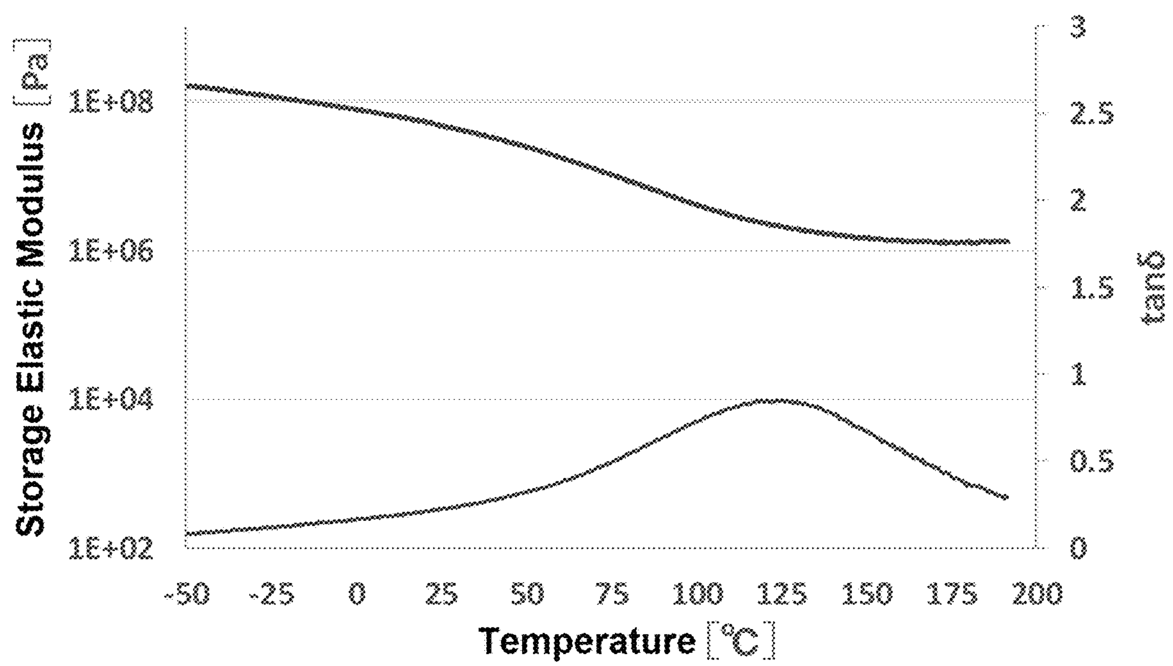

MULTILAYER BODY AND ELECTRONIC COMPONENT FORMED OF SAME

CROSS-REFERENCE TO RELATED APPLICATIONS

This application is the U.S. National Stage of International Application No. PCT/JP2020/049075 filed on 28 Dec. 2020, which claims priority to and all advantages of Japanese Patent Application No. 2019-238728 filed on 27 Dec. 2019, and Japanese Patent Application No. 2019-238730 also filed on 27 Dec. 2019, the contents of which are incorporated herein by reference.

TECHNICAL FIELD

The present invention relates to a laminate body containing one or two base materials, a curable hot melt silicone composition layer in close contact with the base materials, and optionally a multilayer laminate body that may further include a functional layer.

BACKGROUND ART

A substrate for an electronic device (for example, a semiconductor device substrate, a semiconductor device on which a semiconductor element is mounted) on which an element used for an electronic component is mounted is sealed using a sealant to protect the element from the outside and to improve durability. In addition, adhesives may also be used to bond electronic components and substrates for electronic devices. Curable silicone compositions are often used as sealants and adhesives because they form a cured product with excellent heat resistance, cold resistance, electrical insulation, weather resistance, water repellency, and transparency.

Here, if the sealing area or the adhesive area is not large, a curable silicone composition that is liquid at room temperature is applied to the base material by a dispenser, and then the composition is cured to form a sealing layer or an adhesive layer. In the present specification, room temperature means the temperature of an environment where curable silicone composition of the present invention is handled. Room temperature is typically 0° C. to 40° C., particularly 15° C. to 30° C., and more particularly 18° C. to 25° C.

On the other hand, it is known that as the area to be sealed or adhered becomes large, use of a curable silicone composition that is liquid at room temperature becomes difficult. For example, when used as a sealing agent, methods for sealing include use of compression molding as disclosed in Patent Document 1, or using a dam material as disclosed in Patent Document 2 to block the liquid sealing agent from flowing. However, in compression molding, there is a problem that the sealing agent leaks out of the substrate, so-called burrs are formed after molding, and the removal thereof is cumbersome, or the molding die itself is expensive.

In addition, there are also the problems that for dam materials, two types of dispense formulation materials are needed and if a large area is sealed, the process for removing bubbles after dispensing is cumbersome.

In addition, Patent Documents 3 and 4 propose a process for sealing a semiconductor element through vacuum lamination using a hot melt type silicone film. However, the silicone film disclosed here simply softens at high temperature and does not fully melt and so cannot be liquefied to form a flat surface and seal on the substrate for electronic devices with fine irregularities, in other words, a so called conformal coating is proposed.

On the other hand, if a silicone composition is used as an adhesive, there is the problem that increased size of adhered surface leads to difficulty in fully removing bubbles from the adhesive layer obtained using a liquid curable silicone composition.

In addition, since the silicone composition generally forms a cured product having a high coefficient of thermal expansion, when a large-area substrate is sealed or adhered, a high amount of stress is applied to the obtained laminate body based on the difference in the coefficient of thermal expansion from the substrate. In conjunction with size reduction of electronic components in recent years, the thickness of substrates has reduced and the problem of warping of the laminate body due to stress has occurred.

PRIOR ART DOCUMENTS

Patent Documents

Patent Document 1: Japanese Patent Number 4607429
Patent Document 2: JP 2014-237834 A
Patent Document 3: WO 2019/049794
Patent Document 4: WO 2019/049791

SUMMARY OF THE INVENTION

Problems to be Solved by the Invention

An object of the present invention is to provide a laminate body including a substrate, in particular a semiconductor precursor substrate, an electronic device substrate, for example, a semiconductor device with semiconductor elements mounted thereon, an electronic circuit substrate, an electronic circuit mounting substrate, and the like, and a flat silicone sealing layer adhered thereto without any voids as well as a laminate body with a structure of two of the same or different base materials adhered together by a silicone layer interposed therebetween without any voids. A further object of the present invention is through use of a silicone layer with a particular composition as the sealing layer or adhesive layer of the laminate body, providing a laminate body that does not readily impart stress on the substrate as well as an electronic device with low stress that is made from the laminate body.

Means for Solving the Problems

In an aspect, the laminate body according to the present invention is a laminate body including a base material and a curable hot melt silicone composition layer in contact with the base material where the curable silicone composition includes an organopolysiloxane resin containing a siloxane unit selected from a group including a siloxane unit expressed as $R^1SiO_{3/2}$ (where $R^1$ indicates an independent substituted or unsubstituted alkyl, in particular a $C_1$ to $C_{12}$ alkyl group, preferably a methyl group or a substituted or unsubstituted aryl, in particular a $C_6$ to $C_{20}$ aryl group, preferably a phenyl group) and a siloxane unit expressed as $SiO_{4/2}$ making up at least 20 mol % or more of all siloxane units and where the melt viscosity of the curable hot melt silicone composition as measured using a flow tester at a pressure of 2.5 MPa and at 100° C. (at an extreme share rate) is 5,000 Pa·s or less.

In addition, in an aspect of the present invention, as means to resolve the problems described above, a new multilayer laminate body that can be used as a sealing sheet for sealing a base material, for example a substrate, can be provided and the multilayer laminate body can be provided with a multilayer laminate structure including a curable hot melt silicone composition layer and a functional layer in contact with at least one surface of said layer.

Effects of the Invention

The laminate body according to the present invention can be manufactured using a simple method and at low cost and can be obtained by laminating a curable hot melt silicone composition on a substrate to seal the substrate or can be manufactured by adhering two of the same or different types of base materials using a layer containing a curable hot melt silicone composition. Furthermore, the layers including the curable hot melt silicone composition used in the present invention cure to form a cured product with superior stress relief properties, thus providing a laminate body with low internal stress (and thus less susceptible to problems such as warping over time) as well as electronic components containing or including the laminate body thereof.

BRIEF DESCRIPTION OF THE DRAWINGS

FIG. 1 is a schematic cross-sectional view illustrating an example of a method for manufacturing a laminate body of the present invention, which is carried out using a diaphragm type vacuum laminator and a lamination jig.

FIG. 2 is a schematic diagram of a device used in the Embodiments for producing a curable hot melt silicone composition sheet.

FIG. 3 is a graph illustrating viscoelastic properties of a cured product of one curable hot melt silicone composition of the present invention.

MODE FOR CARRYING OUT THE INVENTION

Embodiments of the present invention will be described below in detail. The present invention is not limited by the following embodiments, and various types of modifications may be made within the scope of the gist of the present invention.

Laminate

In an aspect of the present invention, a laminate body includes one or more base materials and a curable hot melt silicone composition layer in contact with the base material. The base material may be any base material that is sealed or adhered using silicone resin, but in particular, an electronic device substrate, particularly an electronic circuit substrate or an electronic circuit mounting substrate, a semiconductor device substrate, or a semiconductor device on which semiconductor elements are mounted are used as substrates. By using the curable hot melt silicone composition of the present invention with an appropriate method, a silicone sealing layer having few or no defects such as voids can be formed on the base material. In addition, in another aspect of the present invention, the laminate body includes first and second, or two, base materials, and a curable hot melt silicone composition layer interposed therebetween. In this case, by using the curable hot melt silicone composition of the present invention in an appropriate method, a laminate body having two of the same or different types of base materials adhered together with a curable hot melt silicone composition layer containing few or no defects such as voids interposed can be obtained. In this case, one of the two base materials is preferably a substrate for an electronic device, particularly an electronic circuit substrate or an electronic circuit mounting substrate, a substrate for a semiconductor device, or a semiconductor device substrate on which a semiconductor element is mounted. The other base material is the same or different substrate selected from the aforementioned substrates, or a completely different substrate or base material, for example, a base material for protecting a substrate or the like for an electronic device, a peelable protective sheet or film, for example, a protective film or a peelable film. Therefore, the laminate body in this case has a three-layer structure including the first and second base materials and a curable hot melt silicone composition adhesive layer for adhering the two substrates interposed therebetween. In these aspects, with the laminate body of the present invention, a base material, for example, a substrate for an electronic device or the like, is temporarily secured by a curable hot melt silicone composition layer. As described below, viscosity does not go down for this silicone composition even if melted when no pressure is applied and this composition will not flow under its own weight so the volume change for this silicone composition while curing is smaller than for a conventional liquid curable silicone composition. Further, by using a curable hot melt silicone composition having excellent stress relief properties, which will be described below, stress that is generated in the laminate body when the silicone composition is cured can be significantly reduced.

Further, in the present specification, the curable hot melt silicone composition sheet or film is also simply referred to as a “sealing sheet” for the sake of simplicity, but note that the term sealing sheet is not limited to the case of use as a sealing agent but also includes the case of use as an adhesive. Therefore, the “sealing sheet” of the present invention includes both cases where the sheet is used as a sealing agent and cases where the sheet is used as an adhesive.

Substrate or Base Material for Electronic Devices

The substrate or base material which is a part of the structure of the laminate body of the present invention is not particularly limited, but a component used in an electronic device or a substrate on which such a component is mounted is particularly preferable. Examples of such objects include, but are not limited to, electronic device boards, in particular, electronic circuit substrates or electronic circuit mounting substrates, semiconductor device substrates, or semiconductor device substrates on which semiconductor elements are mounted. Since the cured product obtained by curing the curable hot melt silicone composition used in the present invention has excellent coloring resistance at high temperatures, use with a laminate body for the base material of an optical semiconductor device where transparency of the sealing material is desired is preferable in particular. Therefore, examples of the base material include a substrate on which an electronic circuit is mounted, a plastic-based substrate represented by a PCB substrate, a metal-based substrate represented by aluminum, copper, nickel, silicon, and the like, a ceramic-based substrate represented by aluminum nitride, alumina, and silicon carbide, and a substrate used for various types of electronic devices or electronic materials (hereinafter called electronic substrates). With respect to this manner of laminate body having a two-layer structure of an electronic substrate and a silicone layer, the silicone layer is generally called a “sealing layer”, and the surface layer of the sealing layer is flat depending on the application of the electronic material. By producing a laminate body of a specific silicone layer, which will be described below using a specific sealing step, the surface layer can be provided with uniform flatness. Substrates for electronic devices or electronic materials often have circuits or the like mounted thereon, and the substrate surface has irregularities, and in the sealing process, the substrate needs to be sealed with this silicone layer along the shape of these irregularities without inclusion of bubbles. As will be described below, by laminating the curable hot melt silicone composition layer on the substrate in a specific sealing step using a specific hot melt silicone composition layer, the gaps formed by the irregularities can be filled with silicone without inclusion of bubbles.

On the other hand, a three layer structure laminate body configured using the curable hot melt silicone composition layer of the present invention or a layer obtained by curing this composition as an "adhesive layer" to adhere the same or different first and second base materials (first base material—curable hot melt silicone composition layer—second base material) can be formed. In this case as well, a substrate selected from the aforementioned substrates can be used as the base material, but when this manner of base material is used as the first base material, the second base material can be a base material composed of a different material than the aforementioned electronic device substrate or the like. As this manner of different base material, various types of materials such as a glass plate, plastic plate, metal plate, or ceramic plate can be used and the material can be selected in accordance with the application of the electronic device to be produced. As described above, any material may be used as the base material, but the surface where the curable hot melt silicone composition layer and the base material are in contact, in other words, the adhesive surface, should not contain voids or the like, and depending on the circuit of the base material or the like, the irregularities may need to be completely filled with a curable silicone composition. Therefore, a layer including a specific curable hot melt silicone composition described below is preferably applied on a base material using a specific process.

Regardless of whether the laminate body has the two-layer structure or three-layer structure described above, if a laminate body is produced using a curable silicone composition that does not have hot-melt properties and is liquid at room temperature, removal of the voids between the base material and the silicone composition layer is difficult and if the size of the laminate body is large, complete removal of the voids is impossible in some cases. On the other hand, since a hot-meltable curable silicone composition is used in the present invention, a two layer or three layer structure laminate body without voids can be manufactured regardless of the size of the laminate body.

In general, any base material (including a substrate) has a low coefficient of thermal expansion, but the coefficient of thermal expansion of the silicone layer laminated on the base material is high, so when they are assembled and a laminate body is formed, stress occurs at a level that cannot be ignored. Therefore, a laminate body in which the base material is temporarily secured by a layer including a curable silicone composition having hot melt properties (a layer including a curable hot melt silicone composition) as defined in the present invention can suppress stress generation and so is preferable. In particular, when the base material 1 and the base material 2 are different from each other in a three-layer structure laminate body, the base material 1 and the base material 2 usually have different coefficients of thermal expansion, and therefore considerable thermal stress is applied to the layers that adhere these base materials together. In order to handle this manner of application, a silicone layer with a specific curable composition described below is preferably used as the laminate body according to the present invention.

Surface Treatment of Substrate or Base Material

In order to increase adhesion with a layer (a layer including a curable hot melt silicone composition) including a substrate or base material as well as a curable silicone composition having hot melt properties that is part of the structure of a laminate body according to the present invention, surface treatment or primer treatment such as an oxidation method or roughening method may be performed on the surface of the aforementioned substrate or base material at a level such that the technical effect of the present invention is not lost and then the layer including the curable hot melt silicone composition may be laminated. Here, examples of the oxidation method include corona discharge treatment, plasma discharge treatment, chromium oxidation treatment (wet), flame treatment, hot air treatment, ozone treatment, ultraviolet irradiation treatment, and the like, and the roughening method includes sandblasting treatment and thermal spraying method and the like. For these surface treatment methods, a suitable method can be selected according to the type of substrate or base material and the required adhesion, but if a part of the structure of the laminate body according to the present invention is a glass plate, a plastic plate, a metal plate, a ceramic plate or the like, the corona discharge treatment method is an example of a preferable method based on the effect obtained through surface processing, the improvement effect on adhesion being particularly high, and because the treatment can easily be performed. Said surface treatment may improve the contact interface adhesion after laminating, particularly adhesion of the layer including the curable hot melt silicone composition and the substrate or base material prior to the curing reaction being performed.

Curable Hot Melt Silicone Composition

Regarding the curable hot melt silicone composition used for the laminate body according to the present invention, any composition may be used, as long as the composition is a hot-meltable curable silicone composition including an organopolysiloxane resin containing a siloxane unit selected from a group including a siloxane unit expressed as $R^1SiO_{3/2}$ (where $R^1$ indicates an independent substituted or unsubstituted alkyl, in particular a $C_1$ to $C_{12}$ alkyl group, preferably a methyl group or a substituted or unsubstituted aryl, in particular a $C_6$ to $C_{20}$ aryl group, preferably a phenyl group) and a siloxane unit expressed as $SiO_{4/2}$ that make up at least 20 mol % or more of the total siloxane units and the melt viscosity at 100° C. (at an extreme share rate) measured at 2.5 MPa using a curable hot melt silicone composition flow tester is 5,000 Pa·s or less. From the perspective of filling the gaps of the irregularities on the substrate and pressure bonding the substrate without foaming of the silicone composition layer, in other words, no defects such as voids, the aforementioned melt viscosity should be 3,000 Pa·s or less, more preferably 1,000 Pa·s or less, and even more preferably 500 Pa·s or less.

However, a particularly preferable curable hot melt silicone composition is a curable silicone composition having hot-melt properties containing at least (A) an organopolysiloxane resin containing a siloxane unit expressed as $SiO_{4/2}$ making up at least 20 mol % or more of the total siloxane units, and (B) a straight or branched chain organopolysiloxane which is liquid or has plasticity at 25° C.

Further, the laminate body according to the present invention preferably uses a curable hot melt silicone composition having a melt viscosity at 100° C. at a shear rate of 1 $s^{-1}$ of 5,000 Pa·s or less, and a melt viscosity at 100° C. measured at a pressure of 2.5 MPa using a flow tester of 500 Pa·s or less.

Furthermore, the curable hot melt silicone composition used for the laminate body according to the present invention has a tan δ, that is the ratio of the storage elastic modulus and the loss elastic modulus for the cured product, obtained by curing the curable hot melt silicone composition in a temperature range of 100° C. or more from −50° C. to 200° C., of 0.05 or more, and preferably 0.1 or more.

In addition, a cured product obtained by curing the curable hot melt silicone composition used for the laminate body according to the present invention preferably has a shore A hardness of 40 or more.

Hereinafter, some examples of the curable hot melt silicone composition used in the present invention will be described. The curing reaction of the curable hot melt silicone composition is not limited to a specific reaction. Any curing reaction may be used, such as curing by a hydrosilylation reaction, curing by a radical reaction including organic peroxide curing and UV curing, and curing by a condensation reaction. Examples of the curable hot melt silicone composition that can be used for the present invention includes a composition containing a (A) curable organopolysiloxane resin and a (C) curing agent and/or a (D) curing catalyst, and as necessary a (B) straight-chain or branched organopolysiloxane, a (E) curing retarder, and (F) other additives such as a functional organic filler.

A particularly preferable example of a curable hot melt silicone composition that can be used for the present invention is a hydrosilylation curable composition described below.

Particularly Preferable Curable Hot Melt Silicone Composition

The curable hot melt silicone composition of the present invention is a thermosettable silicone composition that uses a hydrosilylation reaction, containing as main components:

(component A') a combination of (A1') an organopolysiloxane resin containing a curing reactive functional group including a carbon-carbon double bond in the molecule and containing a siloxane unit expressed by $SiO_{4/2}$ making up at least 20 mol % of all siloxane units, that does not independently have hot-melt properties and is solid at 25° C.;

(A2') an organopolysiloxane resin that does not have a curing reactive functional group containing a carbon-carbon double bond in the molecule while containing a siloxane unit expressed by $SiO_{4/2}$ making up at least 20 mol % or more of all siloxane units, that does not independently have hot-melt characteristics and is solid at 25° C.;

at a mass ratio of (A1'):(A2) [sic]=0:100 to 90:10, preferably 0:100 to 75:25; and (component (B')) a straight or branched chain organopolysiloxane containing a carbon-carbon secondary bond, that is liquid or has plasticity at 25° C.; and also containing (component (C')) organohydrogenpolysiloxane as a crosslinking agent; and (component (D')) a hydrosilylation reaction catalyst. The curable hot melt silicone composition of the present invention uses an organohydrogenpolysiloxane having a specific chemical structure in particular as an organohydrogenpolysiloxane including a silicon atom-bonded hydrogen atom, that is a crosslinking agent, where after exposure to the atmosphere for one hour at 100° C., mass loss is 10% or less relative to the mass prior to exposure. In addition, in the curable hot melt silicone composition of the present invention, a hydrosilylation reaction retarder, a so-called curing retarder, may be used, but in that case, a curing retarder with a boiling point of 200° C. or higher, in particular, a boiling point of 200° C. or higher under one atmosphere of pressure (1,013.25 hPa) is preferably used. Further, the composition of the present invention uses organopolysiloxane resins with no independent hot-melt properties as components (A1') and (A2') but is characterized by the composition as a whole, including components (B') to (D'), to have hot-melt properties. Note, with the present invention, unless otherwise stated, "having hot-melt properties" means the softening point of the composition is between 50 and 200° C., the composition has melt viscosity at 150° C. (suitably, melt viscosity of less than 1,000 Pa.$), and has flowable properties. Therefore, in the present specification, the hot-meltable curable silicone composition of the present invention is also referred to as a curable hot melt silicone composition.

Removal of Volatile Low Molecular Weight Components in Component (A')

For the component (A1') and the component (A2'), volatile low molecular weight components are produced in each production process. Specifically, the volatile low molecular weight components appear as byproducts from polymerizing the organopolysiloxane resins that have a $M_4Q$ structure containing an M unit ($R^3{}_3SiO_{1/2}$) and a Q unit ($SiO_{4/2}$). This structure has the effect of significantly lowering the hardness of the cured product obtained from the curable silicone composition of the present invention, but the $M_4Q$ structure is highly compatible with the organopolysiloxane resin and is difficult to remove under drying conditions that would remove organic solvents. From the perspective of efficient production of the curable hot melt silicone composition of the present invention, adding the component (B'), described below, to the mixture of component (A2') or component (A1') and component (A2') dissolved in an organic solvent and feeding the mixture in a liquid state into a twin screw extruder set at 200° C. or higher and performing a process of removing volatile components such as $M_4Q$ structures is preferable. This method enables obtaining a mixture of component (A') and component (B') having hot-melt properties which can be used for kneading in the remaining components included in the curable silicone composition in a process described below.

Curable Hot Melt Silicone Composition Sheet or Film

In the present invention, a curable hot melt silicone composition is applied to the base material to form a layer of said composition on the base material in the manufacturing of the laminate body according to the present invention. Any known method for providing a curable hot melt silicone composition on a base material can be used to apply the hot melt composition on the base material, such as compression molding, press molding, and vacuum lamination, and manufacturing the laminate body according to the present invention using any of these methods is preferred. The most preferred method, however, is to produce a laminate body by forming the curable hot melt silicone composition into a sheet or film beforehand, laminating the composition onto a base material or interposing the composition between two base materials, heating to melt the sheet or film, and then pressure bonding the base material onto the melted silicone composition. The following describes a sheet or film that includes the curable hot melt silicone composition of the present invention (as described above, in the present specification, if used as an encapsulant or as an adhesive, the composition is still called a "sealing sheet"). The component included in the sealing sheet is a curable hot melt silicone composition with the thermal melting properties described above. The curable hot melt silicone composition including the above sealing sheet is measured by a flow tester at a pressure of 2.5 MPa (at the extreme shear rate) and the melt viscosity at 100° C. should be 5,000 Pa·s or less. Note, in the JIS packaging terminology standard, a film is defined having a thickness of less than 250 μm, and a sheet is defined as having a thickness of 250 μm or more. In this specification, the terms sheet and film are used, but in this specification, they are also referred to collectively as simply "sheet". Therefore, even when simply referring to a "sheet" in this specification, the thickness includes not only sheets of 250 μm or thicker, but also sheets of less than 250 μm.

In one aspect of the present invention, the curable hot melt silicone composition layer included in the laminate body may be a single layer or have a multilayer laminate structure in which two or more layers are combined. When combining two or more curable hot melt silicone composition layers, curable hot melt silicone composition layers with different compositions and properties in each layer are used. For example, a layer including a composition with lower melt viscosity can be provided on the surface to adhere to the first base material side and a layer including a composition with higher melt viscosity on the surface opposite the first base material, or a layer including a composition with higher adhesive strength after curing can be provided on the surface to adhere to the first base material and a layer including a composition with lower surface tack after curing can be provided on the surface on the opposite side of the first base material. However, the composition and physical properties of the two or more curable hot melt compositions used to provide a curable hot melt silicone composition layer combining two or more layers can be set arbitrarily and are not limited to any particular combination. In one preferred aspect of the present invention, the curable hot melt silicone composition layer included in the laminate body is a single layer consisting of one type of curable hot melt silicone composition.

An example of the method of producing a laminate body having two or more curable hot melt composition layers as described above includes the method of layering one layer at a time so that two or more curable hot melt silicone composition layers are laminated in sequence. To do this, a method of using any of the known methods such as compression molding, press molding, vacuum lamination, or the like to place a first layer of curable hot melt silicone composition on the base material, and then to place a second layer of curable hot melt silicone composition layer on top of the first layer of cured hot melt silicone composition can be used. The same is true for a third or higher layer.

Curable Hot Melt Silicone Composition Sealing Sheet

A sealing sheet is for sealing the base material to be sealed, for example, a substrate for an electronic device and forming a curable hot melt silicone composition layer for configuring the laminate body according to the present invention or can be used as an adhesive for adhering a curable hot melt silicone composition to form a laminate body and is the curable hot melt silicone composition produced as a sheet or a film. The sealing sheet may be used alone or in combination of two or more sheets. When two or more sealing sheets are used, two or more sealing sheets of the same type may be used, or a combination of different types of sealing sheets may be used. When combining two or more sealing sheets, it is generally preferable to combine the sheets by overlapping them. Before use, the sealing sheet may be laminated on top of a release film or interposed between two release films, and if the sealing sheet is interposed between two release films, normally one of the release films needs to be peeled away for use. The sealing sheet of the present invention is a curable silicone composition sheet with hot-melt properties. The melt viscosity thereof measured using a flow tester at a pressure of 2.5 MPa (at an extreme shear rate) must be 5,000 Pa·s or lower at 100° C. As described below, if the sealing sheet does not sufficiently melt when the sealing sheet is thermocompression bonded to the substrate under reduced pressure, forming of a flat sealing layer without any voids on the base material, in other words, foaming, is difficult. By using a sealing sheet prepared from a curable hot melt silicone composition with a melt viscosity of 5,000 Pa·s or less at 100° C., a flat silicone sealing layer without voids can be formed on the base material.

Curable Hot Melt Silicone Composition Sheet (Sealing Sheet) Manufacturing Method A curable hot melt silicone composition sheet (also called "sealing sheet" in this specification) is preferably used for manufacturing the laminate body according to the present invention. Sealing sheets can be manufactured using methods known in the art and are not limited to any particular method.

The curable hot melt silicone composition sheet described above according to the present invention may be manufactured using organopolysiloxane resin particles as the raw material (Method A) or organopolysiloxane resin in solid form at room temperature and optionally chain-like diorganopolysiloxane dispersed in an organic solvent, with which after the organic solvent is removed, the solids with hot-melt properties may be used as raw material (hot bulk method) (Method B).

Laminate

The laminate body obtained from the process described above is a laminate body having a sealing sheet including a curable hot melt silicone composition: that contains components (A') to (D') as essential components and component (E') as an optional component; that is essentially flat; and that has a thickness of 10 to 2,000 μm; provided in a structure of being laminated between two release films including at least one release surface. Note, the films are preferably provided as a surface structure with enhanced surface release or a surface-treated release surface.

The sealing sheet having a release film on one or both surfaces obtained as described above is preferably used in manufacturing a laminate body including a base material described above, for example, a substrate for electronic devices, an electronic circuit substrate, or an electronic circuit mounting substrate and a curable hot melt silicone composition layer laminated thereto or in manufacturing a laminate body including a base material and a cured silicone composition layer laminated thereon.

When manufacturing a sealing film including a curable hot melt silicone composition layer containing two or more layers made up of curable hot melt silicone composition layers with two or more different compositions respectively, examples of methods of performing steps 3 and 4 described above include dispensing or coating a first heated and melted curable hot melt silicone composition on a first release film, optionally cooling this composition, dispensing or coating a second curable hot melt silicone composition on the composition layer thereof, and overlaying a separate release film on top thereof; however, the methods are not limited to this method.

Curable Hot Melt Silicone Composition Curing Conditions

The layers of the curable hot melt silicone composition in the laminate body according to the present invention are cured by leaving them at room temperature or by heating. Curing the curable hot melt silicone composition layer produces a laminate body including the base material and the silicone layer adhered thereto or a laminate body including two base materials and a silicone layer interposed therebetween as an adhesive. However, from the viewpoint of accelerating the curing of the curable hot melt silicone composition, curing the laminate body containing a layer of uncured or semi-cured curable hot melt silicone composition and one or two base materials as-is at 150° C. or higher for one hour or more is preferable.

Viscoelastic Properties of Cured Material

The cured product obtained by curing the curable hot melt silicone composition used in the laminate body according to the present invention exhibits characteristic viscoelastic properties. When dynamic viscoelasticity is measured while varying the temperature, silicone cured products in general show a sharp glass transition at a certain temperature, depending on the network structure and the type of functional groups. In other words, the curve of tan δ, which is the ratio of storage elastic modulus to loss elastic modulus, has a sharp peak at a certain temperature. In general, the tan δ value being high means that applied forces are dispersed (relieved) so it can be said that materials with high tan δ have superior stress relief properties. Here, the cured product obtained by curing the curable hot melt silicone composition used in the laminate body according to the present invention preferably does not show a sharp tan δ peak at a particular temperature but rather shows characteristics of a high tan δ value over a wide range of temperatures (FIG. 3).

Hardness of the Cured Product Obtained by Curing the Curable Hot Melt Silicone Composition The suitable hardness of the cured product obtained by curing the curable hot melt silicone composition of the present invention can be classified into two categories depending on the application thereof. In the case of a silicone layer interposed between two base materials where both surfaces of the silicone layer is in contact with a base material, the type A durometer hardness specified in the JIS K7215-1986 "Durometer Hardness Test Methods for Plastics" is preferably 40 or higher. This is because if the hardness is below the lower limit described above, the cured material tends to be too soft and brittle. On the other hand, in the case of a laminate body with a silicone layer adhered to one base material, for example, if the application of the curable hot melt silicone composition is substrate encapsulation, a type A durometer hardness of 60 or higher is preferred. This is because if the hardness is below this lower limit, the surface of the cured material becomes sticky and handling performance is reduced.

Layer Other than Base Material and Curable Hot Melt Silicone Composition Layer

The layer made up of curable hot melt silicone compositions included in the laminate body according to the present invention may be a single layer containing one type of composition or may be two or more layers each containing two or more different types of compositions. Furthermore, if the laminate body according to the present invention consists of one base material and a layer of curable hot melt silicone composition, an additional layer may be provided on the side of the layer of curable hot melt silicone composition that is not in contact with the base material. Examples of additional layers include layers of materials with higher release-ability than the layers of a curable hot melt silicone composition (release layer) or layers having water repellency or oil repellency. This manner of layer can be formed by laminating a material with such properties onto the curable hot melt silicone composition layer that is not in contact with the laminate body [sic]. Materials that are known in this technical field can be used as materials with the aforementioned characteristics.

Multilayer Laminate Body

The laminate body according to the present invention includes the form of a multilayer laminate body and has a multilayer laminate structure consisting of a curable hot melt silicone composition layer and a functional layer in contact with one of the two surfaces of the aforementioned layer. The shape of the multilayer laminate body is not particularly limited, but is preferably in sheet or film form.

To simplify handling and achieve a form simplifying storage regarding a multilayer laminate body of the present invention, a release film (including a protective film, same hereinafter) can be adhered to one of the two outer surfaces provided on the multilayer laminate body, in other words, the outer surface not in contact with the curable hot melt silicone composition layer of the functional layer or the outer surface not in contact with the functional layer of the curable hot melt silicone composition layer and this manner of peelable laminate body is included in the present invention. The form in which a release film is adhered to the outer surface of the curable hot melt silicone composition layer is particularly preferable. Another aspect of the present invention is a peelable laminate body in the form of a release film adhered to both the outer surface of the functional layer and the outer surface of the curable hot melt silicone composition layer of the multilayer laminate body of the present invention, which is also included in the present invention.

Selection and Design of Functional Layers of the Multilayer Laminate Body

The layer made up of curable hot melt silicone compositions included in the laminate body according to the present invention may be a single layer containing one type of composition or may be two or more layers each containing two or more different types of compositions. Furthermore, if the laminate body according to the present invention consists of one base material and a layer of curable hot melt silicone composition, an additional layer may be provided on the side of the layer of curable hot melt silicone composition that is not in contact with the base material. By adding layers with various functions as additional layers, the multilayer body can be provided with various functions. For example, providing a layer that is much harder than the layer containing the curable hot melt silicone composition enables achieving a hard coating on the surface of the multilayer body. Similarly, laminating a layer with lower tack than the cured product containing the curable hot melt silicone composition enables reducing the tack of the multilayer body surface. In addition, if the curable hot melt silicone composition layer is transparent and transmits light, the optical properties of the laminate body can be controlled by laminating a layer with a different refractive index as the surface layer thereof. Similarly, a light-diffusing layer can be provided on the surface layer of the laminate body to give the laminate special optical properties.

Base Material with No Peeling Property and Laminate Body Formed from Multilayer Laminate Body Described Above The present invention also provides a laminate body including a multilayer laminate body containing the functional layer and curable hot melt silicone composition layer described above and base material without peeling properties. This aspect includes a laminate body in the form of a non-peelable base material, especially a substrate, sealed using the multilayer laminate body described above as a sealing sheet. The non-peelable base material may be any base material to be covered or sealed using silicone resin, but in particular, cases where an electronic device substrate, particularly an electronic circuit substrate or an electronic circuit mounting substrate, a semiconductor device substrate, or a semiconductor device on which semiconductor elements are mounted are used as substrates. By using a sealing sheet including the curable hot melt silicone composition layer of the present invention with an appropriate method, a silicone sealing layer having few or no defects such as voids can be formed on the base material. In addition, in another aspect of the present invention, the laminate body includes first and second, or two, base materials, and the multilayer laminate body interposed therebetween. In this case, by using the multilayer laminate body of the present invention in an appropriate method, a laminate body having two of the same or different types of base materials adhered together with a curable hot melt silicone composition layer and a functional layer containing few or no defects such as voids interposed can be obtained.

Substrate or Base Material for Electronic Devices

The non-peelable substrate or base material which is a part of the structure of the laminate body of the present invention is not particularly limited, but a component used in an electronic device or a substrate on which such a component is mounted is particularly preferable. Examples of such objects include, but are not limited to, electronic device boards, in particular, electronic circuit substrates or electronic circuit mounting substrates, semiconductor device substrates, or semiconductor device substrates on which semiconductor elements are mounted. Since the cured product obtained by curing the curable hot melt silicone composition used in the present invention has excellent coloring resistance at high temperatures, use with a laminate body for the base material of an optical semiconductor device where transparency of the sealing material is desired is preferable in particular.

Different from the base material to be sealed using the multilayer laminate body as a sealing sheet, the functional layer of the multilayer laminate body of the present invention may be a layer containing a second base material without peeling properties. In this manner of second base material or base material different from the non-peelable base material described above, various types of materials such as a glass plate, plastic plate, metal plate, or ceramic plate can be used and the material can be selected in accordance with the application of the electronic device to be produced.

Laminate Body Including Multilayer Laminate Body and Non-Peelable Base Material The multilayer laminate body obtained as described above, having release films on one or both sides thereof, can be used as a sealing material to cover the base material and provide protection from the external environment, and in such a case, the multilayer laminate body described above can be called a sealing sheet. The sealing sheet can be used to seal a variety of non-peelable base materials, and the base material is arbitrary. Therefore, the present invention also provides a laminate body in which a non-peelable base material is sealed with the multilayer laminate body described above. Known methods of laminating a non-peelable base material to a multilayer laminate body consisting of a functional layer and a curable hot melt silicone composition layer of the present invention include compression molding, press molding, vacuum lamination, and the like and the vacuum lamination method described below is preferable in particular.

Manufacturing Method of the Laminate Body Consisting of a Base Material and the Curable Hot Melt Silicone Composition Layer Of the laminate bodies according to the present invention, a laminate body consisting of a base material and curable hot melt silicone composition layer adhered thereto can be manufactured by overlaying the curable hot melt silicone composition, in particular a sheet of this composition, described above on a base material and heating and melting the curable hot melt silicone composition to cause adherence to the base material. In the case of a laminate body containing two base materials and a layer of curable hot melt silicone composition interposed therebetween, the curable hot melt silicone composition, in particular a sheet of the composition, is overlaid on the first base material, the curable hot melt silicone composition is heated and melted to adhere to the first base material to form a layer containing the curable hot melt silicone composition, next, the surface of the second base material is overlaid on the surface of the layer including the curable hot melt silicone composition that is not in contact with the first base material which is then heated and melted to cause the curable hot melt silicone composition layer to adhere to the second base material. Alternatively, a laminate body can be produced without capturing the laminate body including the first base material and the curable hot melt silicone composition layer adhered thereto from the manufacturing device as an intermediate body but by causing the first base material and the second base material to adhere to both surfaces of the sheet including the curable hot melt silicone composition in a series of operations. However, the method of producing the laminate body according to the present invention is not limited to these methods. When preparing a laminate body using a sealing sheet including a curable hot melt silicone composition sheet interposed between two release films, in other words, sandwiched between two release films, a first release film can be removed and the curable hot melt silicone composition sheet on the surface from which the release film was removed can be adhered to the first base material and a second release film can be allowed to remain as-is. This enables obtaining a structure of (first base material—curable hot melt silicone composition layer—release film) and this manner of laminate body is within the scope of the present invention.

A method of manufacturing the laminate body of the present invention using the sealing sheet described above is described below, but the method of manufacturing the laminate is not limited to those methods.

In one aspect, a laminate body of one base material according to the present invention and a curable hot melt silicone composition layer in contact thereto, in particular having been adhered thereto can be manufactured using a method with the following steps:

step 1: a step of arranging a sheet or film (also called "sealing sheet") containing the curable hot melt silicone composition in a reduced-pressure chamber with respect to a base material arranged in the chamber such that the sheet or film can be caused to come into contact with the base material in a subsequent step; a step in a reduced-pressure chamber of placing a sheet or film containing the curable hot melt silicone composition on a base material arranged in the chamber; or a step of setting a base material with a sheet or film containing the curable hot melt silicone composition placed so as to contact the base material beforehand in a reduced-pressure chamber;

step 2: a step of depressurizing in the reduced-pressure chamber to a prescribed pressure;

step 3: a step of heating inside the reduced-pressure chamber at reduced pressure to melt the curable hot melt silicone composition sheet or film and adhere it to the base material and, as needed, press one or both of the base material and sheet or film, after adhering, to pressure bond the curable hot melt silicone composition sheet or film to the base material; and step 4: a step of canceling the pressure reduction inside the reduced-pressure chamber and removing the laminate body including a layer containing the curable hot melt silicone composition, a cured layer thereof, a layer selected from a group containing half-cured layers, and a base material in contact with this layer from the chamber.

Here, with the present invention, the sealing sheet including a curable hot melt silicone composition has a melt viscosity measured (at an extreme shear rate) at 2.5 MPA using a flow tester of 5,000 Pa·s or lower at 100° C.

This method can be used to produce a laminate body containing a layer of curable hot melt silicone composition and a base material in contact with this layer, while suppressing defects such as voids.

With the method of the present invention, the curable hot melt silicone composition sheet or film (hereinafter, if simply "sheet" is noted, film is included in sheet unless otherwise specified) is heated to melt the sheet and in a pressure bonding process to a base material, for example, an electronic device substrate, the substrate can be covered with a silicone composition layer without bubbles between the silicone composition sheet and the substrate, sealing the substrate with a silicone composition. This enables easy production of an electronic device substrate, for example an electronic circuit substrate, or electronic circuit mounting substrate with a sealing layer with a flat surface. This produces a laminate body that includes a base material and a curable hot melt silicone composition layer in contact with the base material. In particular, because the method of the present invention uses a curable hot melt silicone composition sheet in which the melt viscosity of the silicone composition is sufficiently low, when the curable hot melt silicone composition is heated and pressure bonded to the substrate, even if the base material is a substrate with fine irregularities, especially a large-area substrate, the substrate can quickly and easily be sealed using the curable silicone composition without bubbles between the substrate and the silicone composition and thus, a laminate body can be manufactured. By further curing this curable silicone composition, a cured silicone composition layer is laminated to the substrate, in other words, a laminate body in which the substrate is sealed with the cured silicone composition can be obtained.

EXAMPLES

The following is a more detailed description of the laminate body of the present invention based on examples and comparative examples. In the average unit formula and chemical formula for the raw materials of the curable hot melt silicone composition sheet used, Me, Vi, and Ph mean methyl, vinyl, and phenyl groups, respectively. In addition, the hardness of the cured product used for each Example and Comparative Example, the cycle time of the manufacturing process, the thickness of the manufactured curable hot melt silicone composition sheet, in other words, the curable hot melt silicone composition layer (also called sealing layer) derived from the sealing sheet in the laminate body with regards to the laminate body containing the sealing sheet and semiconductor substrate, the flatness and tackiness of the laminate body/sealing layer surface, warpage of the laminate body after the sealing layer is hardened, and thermal cycle durability of the laminate body using the following method were measured and the results are indicated in Table 1.

Hardness of Cured Product

The hardness of the cured product of the present invention containing the curable silicone composition was measured using a type D durometer as stipulated in JIS K 7215-1986 "Testing Methods for Durometer Hardness of Plastics".

Manufacturing Process Cycle Time

In each of the following processes, the time taken to obtain a laminate body from a state of the sealing sheet and the substrate being separated or from a state of the sealing sheet simply being placed on the substrate at room temperature to the sealing layer formed from the sealing sheet on the substrate being fully pressure bonded to the substrate without voids at the interface of the sealing sheet and the substrate was measured. Specifically, the cycle time of each manufacturing process was defined as the time from the point at which the substrate or substrate with a sealing sheet was placed thereon was set in the reduced-pressure chamber until the resulting laminate body could be removed from the reduced-pressure chamber.

Laminate Body Warpage

For the two-layer structure laminate body including a substrate and sealing layer in the Examples and Comparative Examples, a first end of the laminate body was secured to a flat desk with tape, and the lift of the non-secured end of the laminate from the surface of the desk was measured by measuring the vertical distance (length of lift) from the desk surface to the lifted end using a ruler. This was set to O if the length of lift was 1 mm or less, to Δ for 3 mm or less and X for 5 mm or more.

Uniformity of Sealing Layer Thickness

Using a flat base material of constant thickness, the thickness of the sealing layer of the laminate body obtained by the following process was measured at five random points using a contact-type film thickness gauge (Nikon digital micrometer). This was set to (O) if the difference between the maximum and minimum values is less than 30 μm, O for less than 40 μm, Δ for less than 50 μm, and X if 50 μm or more.

Flatness of the Laminate Body/Sealing Layer

The flatness of the surface of the sealing layer of the laminate body obtained by the following process was measured using a laser microscope (3D MEASURING LASER MICROSCOPE OLS4000 from Olympus). The flatness of the sealing layer surface was evaluated by measuring the distance from the surface layer of the laminate body sealing layer to the bottom surface of the substrate at five random points and this was set to O if the maximum value of the difference between these five measured points was 1 μm or less and X if 5 μm or more.

Surface Tack of the Laminate Body/Sealing Layer

The surface tack of the sealing layer of the laminate body obtained using the following process was evaluated. The evaluation was performed by placing a PET film with no surface treatment on the sealing layer, pushing thereon with a weight of 100 g/cm$^2$ for 30 seconds. This was set to O if the PET film could be peeled smoothly from the sealing layer and to X if peeling was not smooth.

Thermal Cycle Durability of Laminate Body

The laminate body obtained by the following process was subjected to 100 cycles in thermal cycle test equipment (TSA-73 EH by ESPEC) set to repeat −20° C. and 5° C. with one cycle as −20° C. for 30 minutes and 5° C. for 30 minutes. The thermal cycle durability of the test subject was evaluated visually thereafter. The laminate body after the testing was evaluated and set to X for those where peeling or cracking occurs, to O for those without peeling or cracking, and to (O) for those without peeling or cracking after 500 cycles.

Reference Example: Curable Hot Melt Silicone Composition Sheet Preparation

The following raw materials were used in each reference example.

Si resin a1: an organopolysiloxane resin that is a white solid state at 25° C. expressed by the average unit formula:

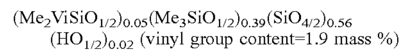

$(Me_2ViSiO_{1/2})_{0.05}(Me_3SiO_{1/2})_{0.39}(SiO_{4/2})_{0.56}(HO_{1/2})_{0.02}$ (vinyl group content=1.9 mass %)

Si resin a2: an organopolysiloxane resin expressed by $(Me_3SiO_{1/2})_{0.44}(SiO_{4/2})_{0.56}(HO_{1/2})_{0.02}$ (vinyl group content=0 mass %)

Si polymer b: $ViMe_2SiO(Me_2SiO)_{800}SiViMe_2$

SiH siloxane c1: an organohydrogenpolysiloxane expressed by $(PhSiO_{3/2})_{0.4}(HMe_2SiO_{1/2})_{0.6}$ (volatile components during aging in oven at 100° C. at atmospheric pressure for one hour, in other words, mass loss rate, of 3.4 mass %)

SiH siloxane c2: an organohydrogenpolysiloxane expressed by $(HMe_2SiO_{1/2})_{0.52}(Me_2SiO_{2/2})_{0.15}(SiO_{4/2})_{0.33}$ (volatile components during aging in oven at 100° C. at atmospheric pressure for one hour, in other words, mass loss rate, of 2.9 mass %)

Reference Example 1

3.09 kg of Si resin a1, 3.77 kg of Si resin a2, and 2.69 kg of Si polymer b was dissolved into 4.00 kg of xylene in a pail using a three-one motor. The resulting solution was fed into a twin-screw extruder with the maximum attainable temperature set to 230° C. The xylene and low molecular weight organopolysiloxane components were removed under a vacuum of XX, resulting in a transparent mixture 1 that exhibits hot-melt properties. The mixture 1 was placed in a pail and cooled to a solid state. The amount of volatile components in this mixture based on conditions of 200° C. for 1 hour were measured and was 0.7 mass %.

The resulting hot melt type mixture 1 was then fed into a twin-screw extruder at 170° C. using a hot-melter (Nordson VersaPail Melter) for cylindrical pails at a rate of 9.56 kg/hr from line 1 as illustrated in FIG. 2.

Next, a mixture of SiH siloxane c2 at 0.295 kg/hr and an amount of methyltris-1,1-dimethyl-2-propinyloxysilane (boiling point=245° C.) achieving 3,500 ppm in the present composition was fed through line 2 as illustrated in FIG. 2.

The set temperature of the feed section was 150° C.

In addition, a mixture of 0.15 kg/hr of Si polymer b and a 1,3-divinyltetramethyl disiloxane complex 1,3-divinyltetramethyl disiloxane solution of platinum (amount to achieve 4.0 ppm in terms of mass units of platinum metal in the final obtained curable hot melt silicone composition overall) was fed through line 3-b of FIG. 2 (set temperature of the feed-in part was 80° C.). The degree of vacuum in the twin screw extruder was −0.08 MPA and the components fed into the extruder were degassed, melted, and kneaded.

The outlet temperature of the twin-screw extruder was set at 80° C. and the mixture was in the form of a semi-solid softened material. The mixture was supplied onto a 125 μm thick release film (FL2-01, manufactured by Takara Inc.) at a supply rate of 5 kg/hr and the mixture was interposed between two release films such that the release surface of the release films contact the mixture and form a laminate body. Subsequently, the laminate body was then stretched by pressurizing the mixture between rolls whose temperature was controlled at 90° C. to form a laminate body in which a curable hot melt silicone composition sheet having a thickness of 300 μm was interposed between two release films, followed by cooling the entire laminate body by air cooling. The configuration of the manufacturing device is illustrated in FIG. 3. When the release film was peeled off from the obtained laminate body, a flat, homogeneous, tack-free, transparent curable hot melt silicone composition sheet without bubbles was obtained.

The melt viscosity of the resulting composite sheet was measured with a flow tester (CFT-500EX, Shimadzu Corporation) at a temperature of 100° C., nozzle diameter=1 mm, and pressure 2.5 MPa, to be 120 Pa·s.

Reference Examples 2 to 4

The composition mixture (amount of volatile components total 0.7 mass % as measured under conditions of 200° C. and one hour) indicated in the table below was used in place of the mixture in Reference Example 1 and the organohydrogenpolysiloxane (amount fed) indicated in the following table was used for SiH siloxane c2. The remainder was the same as Reference Example 1 and a flat, uniform, tack-free, transparent curable hot melt silicone composition sheet without bubbles was obtained and the melt viscosity based on a flow tester is indicated in the table. For Reference Examples 3 and 4, the hardness of the sheet cured material was also measured and shown in the table below.

TABLE 1

| Reference Examples Sheet No. | 1 | 2 | 3 | 4 |
|---|---|---|---|---|
| Mixture composition (kg) | | | | |
| Si resin a1 | 3.09 | 3.76 | 1.37 | 5.80 |
| Si resin a2 | 3.77 | 3.08 | 5.47 | 1.05 |
| Si polymer b | 2.69 | 2.56 | 2.83 | 2.30 |
| SiH siloxane (kg/hr) | | | | |
| C1 | | 0.452 | 0.176 | 0.700 |
| C2 | 0.295 | | | |
| Melt viscosity (Pa · s) | 120 | 130 | 140 | 110 |
| Shore D hardness | — | — | 10 | 45 |

Example 1

A curable hot melt silicone composition sheet (sealing sheet) 1 interposed between two release films obtained in Reference Example 1 was cut into a 4.5 cm×4.5 cm size (square), and one of the two release films was peeled off from the sealing sheet 1. Thereafter, the surface of the sealing sheet 1 without the release film was overlaid on a semiconductor substrate (with a 35 μm thick copper foil pattern placed thereon) with a 6.0 cm×6.0 cm size (square) and 0.2 mm thickness and the sealing sheet 1 was adhered to the semiconductor substrate by hand. The resulting laminate body with a (release film—uncured silicone sealing layer—semiconductor substrate) structure was placed in a vacuum laminator device (manufactured by Nikko Materials Co., Ltd. V-130). Lamination was performed with a vacuum set value of 5.0 hPa, the temperature of the upper and lower heated plates in the reduced-pressure chamber at 110° C., and for 30 seconds. Thereafter, the reduced pressure in the reduced-pressure chamber was canceled and the chamber returned to atmospheric pressure. A laminate body with a fully adhered (release film—uncured silicone sealing layer—semiconductor substrate) structure without any bubbles was obtained. Next, the laminate body obtained in this manner was placed in an oven set to 160° C. for two hours to thermally cure the silicone sealing layer. After removing the laminate body from the oven, the release film on the surface of the silicone sealing layer was peeled off to obtain laminate 1, which includes a cured silicone sealing layer and semiconductor substrate with a flat surface. The characteristics of the laminate body 1 are shown in Table 2.

Example 2

The curable hot melt silicone composition sheet (sealing sheet 1) 1 obtained in Reference Example 1 was cut into a 4.5 cm×4.5 cm size (square), and one of the two release films was peeled off from the sealing sheet 1. Thereafter, the surface of the sealing sheet 1 without the release film was overlaid on a semiconductor substrate (with a 35 μm thick copper foil pattern placed thereon) with a 6.0 cm×6.0 cm size (square) and 0.2 mm thickness and the sealing sheet 1 was adhered to the semiconductor substrate by hand. The resulting laminate body with a (release film—uncured silicone sealing layer—semiconductor substrate) structure was placed on the platform of a reduced-pressure chamber in a vacuum laminator device (manufactured by Nikko Materials Co., Ltd. V-130). Shim spacers with a thickness of 300 μm were placed on both sides of the silicone sealing layer on the semiconductor substrate. Lamination was performed with a vacuum set value of 5.0 hPa, the temperature of the upper and lower heated plates in the reduced-pressure chamber at 180° C., and for 5 minutes. Thereafter, the reduced pressure in the reduced-pressure chamber was canceled and the chamber returned to atmospheric pressure. A laminate body with a fully adhered (release film—cured silicone sealing layer—semiconductor substrate) structure without any bubbles was obtained. Next, the laminate body obtained in this manner was placed in an oven set to 160° C. for two hours to fully cure the silicone sealing layer. After removing the laminate body from the oven, the release film on the surface of the silicone sealing layer was peeled off to obtain laminate body 2, made up of a (flat surface cured silicone sealing layer—semiconductor substrate). The characteristics of the laminate body 2 are shown in Table 2.

Example 3

The curable hot melt silicone composition sheet (sealing sheet 2) 2 obtained in Reference Example 2 was cut into a 4.5 cm×4.5 cm size (square), and one of the two release films was peeled off from the sealing sheet 2. The sealing sheet 2 was placed in the vacuum laminator (manufactured by Nikko Materials Co., Ltd. V-130) so that the release film remaining on one surface of the sealing sheet 2 faced the platform of the reduced-pressure chamber. Next, shim spacers with a thickness of 300 μm bent into a V shape were placed on both sides of the sealing sheet 2 such that the top thereof has a mountain shape higher than the sealing sheet 2 and a glass plate with a size of 6.0 cm×6.0 cm (square) and a thickness of 1 mm was placed on the mountain shape shim spacers. This enables creating a condition where the glass plate does not come into contact with the sealing sheet 2 in the reduced-pressure chamber until the depressurization process is complete. Furthermore, pressure is applied from the upper side of the glass plate, and the shim spacer is pushed and flattened by the glass plate, allowing the glass plate and silicone sheet to make contact for the first time. Under these conditions, the vacuum setting was 5.0 hPa, the temperature of the upper and lower heat plates in the reduced-pressure chamber was set to 110° C. and the inside of the reduced-pressure chamber was heated for 30 seconds. Next, the reduced pressure inside the reduced-pressure chamber was released and the chamber was returned to atmospheric pressure and a laminate body with a (release film—uncured silicone sealing layer—glass plate) structure was obtained. The resulting laminate body was placed in an oven set at 160° C. for 2 hours to thermally cure the curable silicone sealing layer. After removing the laminate body from the oven, the release film on the surface of the silicone sealing layer was peeled off to obtain laminate body 3, which includes a (flat surface cured silicone sealing layer—glass plate) structure. The characteristics of the laminate body 3 are shown in Table 1.

Example 4

After obtaining a laminate body 4 made up of a (release film—uncured silicone sealing layer—glass plate 1) in the same manner as in Example 3, the release film was peeled off the laminate body 4 thus obtained. The laminate body 4 was placed in a vacuum laminator (manufactured by Nikko Materials Co., Ltd. V-130) with the glass plate 1 facing the platform of the reduced-pressure chamber. Next, shim spacers bent into a V shape were placed on both sides of the uncured silicone sealing layer on the glass plate 1 such that the top thereof has a mountain shape and a glass plate 2 with a size of 6.0 cm×6.0 cm (square) and a thickness of 1 mm was placed on the mountain shape shim spacers. Using the same method that was used for laminating the glass plate 1 of the sealing sheet 2, lamination of the glass plate 2 to the uncured silicone sealing layer was performed and a laminate body with a (glass plate 1—uncured silicone sealing layer—glass plate 2) structure without any bubbles was obtained.

The resulting laminate body was placed in an oven set to 160° C. for two hours to thermally cure the uncured silicone sealing layer to obtain laminate body 5 with a (glass plate 1—cured silicone adhesive layer—glass plate 2) structure. The characteristics of the laminate body 5 are shown in Table 2.

Comparative Example 1

VE-6001 (light cured liquid silicone product manufactured by Dow Corning Toray Co., Ltd.) was coated in a dam shape with a wall thickness of approximately 300 μm from a dispenser along the vertical and horizontal edges of a 6.0 cm×6.0 cm (square) semiconductor substrate with a thickness of 0.2 mm (copper foil pattern with a thickness of 35 μm placed thereon), and this was hardened in the dam shape by performing irradiation for ten seconds using a LED light source with a wavelength of 365 nm and irradiation level of 4 $J/cm^2$. Next, approximately 1.1 g of MS-1002 (a thermosetting liquid silicone product manufactured by Dow Corning Toray Co., Ltd.) was coated from a dispenser onto the semiconductor substrate and waiting was performed for the MS-1002 liquid to naturally reach the dam shaped silicone cured product. After visually confirming that MS-1002 spread over the entire inside of the semiconductor substrate enclosed by the dam shaped silicone cured product on the outer edge, this semiconductor substrate was placed in an oven set to 150° C. and the MS-1002 was cured for four hours and by removal from the oven, obtained laminate body 6 made up of a (cured silicone sealing layer—semiconductor substrate). The characteristics of the laminate body 6 are shown in Table 2.

Comparative Example 2

MS-1002 (a thermosetting liquid silicone product manufactured by Dow Corning Toray Co., Ltd.) was semi cured by placing in an oven set to 110° C. for 5 minutes. When the semi cured product was applied to a glass plate and tilted, it did not flow under the weight thereof. Next, this semi cured product MS-1002 was then screen coated at a thickness of 300 μm so as to cover the entire surface of a semiconductor substrate (with a 35 μm thick copper foil pattern placed thereon) having a size of 6.0 cm×6.0 cm (square) and a thickness of 0.2 mm. The obtained laminate body with a (MS-1002 semi cured product—semiconductor substrate) structure was placed in an oven set to 150° C. for four hours to fully cure the MS-1002 and then removed from the oven to obtain laminate body 7 with a (cured silicone sealing layer—semiconductor substrate) structure. The characteristics of the laminate body 7 are shown in Table 2.

Comparative Example 3

VE-6001 (light cured liquid silicone product manufactured by Dow Corning Toray Co., Ltd.) was coated on the outer edge of the substrate in a dam shape with a wall thickness of approximately 300 μm from a dispenser along the vertical and horizontal edges of a 6.0 cm×6.0 cm (square) semiconductor substrate with a thickness of 0.2 mm (copper foil pattern with a thickness of 35 μm placed thereon), and this was hardened in the dam shape by performing irradiation for ten seconds using a LED light source with a wavelength of 365 nm and irradiation level of 4 $J/cm^2$. Next, approximately 1.1 g of VE-6001 was coated from a dispenser on the semiconductor substrate and then waiting was performed for the VE-6001 liquid to naturally reach the dam shaped silicone cured product. After visually confirming that the VE-6001 spread to the entire inside of the semiconductor substrate enclosed by the dam shaped silicone cured product on the outer edge, the VE-6001 was hardened by irradiation for 10 seconds under conditions of a LED light source with a wavelength of 365 nm, and irradiation level of 4 $J/cm^2$, to obtain laminate body 8 with a (cured silicone sealing layer—semiconductor substrate) structure. The characteristics of the laminate body 8 are shown in Table 2.

Comparative Example 4

A 200 μm thick LF-1200 (curable silicone sheet product manufactured by Dow Corning Toray Co., Ltd.) was cut to a 4.5 cm×4.5 cm size (square) and manually overlain on a 6.0 cm×6.0 cm size (square) semiconductor substrate with a thickness of 0.2 mm (copper foil pattern with a thickness of 35 μm placed thereon). Note, LF-1200 is a type of product that softens at high temperature but does not melt and therefore the melt viscosity could not be measured at 100° C. The resulting laminate body having a LF-1200—semiconductor substrate structure was heated for three minutes in a vacuum laminator device (manufactured by Nikko Materials Co., Ltd. V-130) with vacuum settings of 5.0 hPa and the temperature of the upper and lower plates in the reduced-pressure chamber being 130° C. Thereafter, the reduced pressure in the reduced-pressure chamber was canceled and returned to atmospheric pressure and the laminate body was removed therefrom to obtain a laminate body with an (uncured silicone sealing layer without any bubbles—semiconductor substrate) structure. The resulting laminate body was placed in an oven set at 180° C. for 2 hours to thermally cure the uncured silicone sealing layer. The laminate body was removed from the oven to obtain laminate body 9 with a (cured silicone sealing layer—semiconductor substrate) structure. The characteristics of the laminate body 9 are shown in Table 2.

TABLE 2

| | Example 1 | Example 2 | Example 3 | Example 4 |
|---|---|---|---|---|
| Laminate Body Number | 1 | 2 | 3 | 5 |
| Process time | 30 seconds | 30 seconds | 30 seconds | 6 minutes |
| Warpage of laminate body | ○ | — | — | ○ |
| Uniformity of Sealing Layer Thickness | ◎ | ◎ | — | ◎ |
| Flatness of the Sealing Layer | ○ | ○ | — | ○ |
| Surface Tack of the Sealing Layer | ○ | ○ | — | ○ |
| | Comparative Example 1 | Comparative Example 2 | Comparative Example 3 | Comparative Example 4 |
| Laminate Body Number | 6 | 7 | 8 | 9 |
| Process time | Two hours | 1 minute | 5 minutes | 30 seconds |
| Warpage of laminate body | X | X | X | Δ |
| Uniformity of Sealing Layer Thickness | X | X | X | X |
| Flatness of the Sealing Layer | X | X | X | X |
| Surface Tack of the Sealing Layer | ○ | ○ | X | ○ |

Example 5

The curable hot melt silicone composition sheets (sealing sheets) 3 and 4 obtained as Reference Examples 3 and 4 were cut to 4.5 cm×4.5 cm size (square) and one of the two release films were peeled from sealing sheets 3 and 4 and sealing sheets 1 and 2 were laminated by hand. The release film 1 was peeled from the simple laminate body of the obtained (release film 1—sealing sheet 3—sealing sheet 4—release film 2) structure and the two-layer sealing sheet was adhered by hand to a 6.0 cm×6.0 cm (square) semiconductor substrate with a thickness of 0.2 mm (with a 35 μm copper foil pattern placed thereon) so that the sealing sheet 1 surface adhered to the semiconductor substrate. The resulting laminate body with a (release film—uncured silicone sealing layer 4—uncured silicone sealing layer 3—semiconductor substrate) structure was placed in a vacuum laminator device (manufactured by Nikko Materials Co., Ltd. V-130). Lamination was performed for 30 seconds under conditions of vacuum setting value of 5.0 hPa and the temperature of the upper and lower heated plates in the reduced-pressure chamber at 110° C. Thereafter, the reduced pressure in the reduced-pressure chamber was canceled and returned to atmospheric pressure. Thus, a fully adhered laminate body with a (release film—uncured silicone sealing layer 4—uncured silicone sealing layer 3—semiconductor substrate) structure was obtained. Next, the laminate body obtained in this manner was placed in an oven set to 160° C. for two hours to thermally cure the two layer silicone sealing layer. After removing the laminate body from the oven, the release film on the surface of the silicone sealing layer was peeled off to obtain laminate 10, with a (flat surface cured silicone sealing layer 4—cured silicone sealing layer 3—semiconductor substrate) structure. The surface of this laminate body is a cured product including the curable hot melt silicone sheet 4 and the hardness thereof is harder than that of the cured product of curable hot melt silicone sheet 3. The characteristics of the laminate body 10 are shown in Table 3.

Example 6

The curable hot melt silicone composition sheet (sealing sheet) 3 having release films on both surfaces thereof obtained as Reference Example 3 was cut into a 4.5 cm×4.5 cm (square) and one of the two release films was peeled off. A 100 μm thick polycarbonate film (Iupilon FE 2000 manufactured by Mitsubishi Engineering-Plastics Corporation) was cut into a 4.5 cm×4.5 cm size (square) and adhered to the sealing sheet 3 by hand. The resulting simple laminate body was placed in a vacuum laminating device (manufactured by Nikko Materials Co., Ltd. V-130). Lamination was performed for 30 seconds under conditions of vacuum setting value of 5.0 hPa and the temperature of the upper and lower heated plates in the reduced-pressure chamber at 110° C. Thereafter, the reduced pressure in the reduced-pressure chamber was canceled and returned to atmospheric pressure. Thus, a fully adhered laminate body with a (release film—uncured silicone sealing layer 3—polycarbonate film) structure was obtained.

The release film was peeled from the obtained laminate body and the sealing sheet 1 side thereof was adhered by hand to a 6.0 cm×6.0 cm (square) semiconductor substrate with a thickness of 0.2 mm (with a 35 μm copper foil pattern placed thereon). The resulting (polycarbonate film—uncured silicone sealing layer 3—semiconductor substrate) laminate body was placed in a vacuum laminator device (manufactured by Nikko Materials Co., Ltd. V-130). Lamination was performed for 30 seconds under conditions of vacuum setting value of 5.0 hPa and the temperature of the upper and lower heated plates in the reduced-pressure chamber at 110° C. Thereafter, the reduced pressure in the reduced-pressure chamber was canceled and returned to atmospheric pressure. Thus, a fully adhered laminate body with a (polycarbonate film—uncured silicone sealing layer 1—semiconductor substrate) structure was obtained. The laminate body obtained in this manner was placed in an oven set to 160° C. for two hours to thermally cure the silicone sealing layer. The laminate body was removed from the oven to obtain laminate body 11 with a (polycarbonate film (protective layer)—cured silicone sealing layer 3—semiconductor substrate) structure. The characteristics of the laminate body 11 are shown in Table 3.

Example 7

The curable hot melt silicone composition sheet (sealing sheet) 3 having release films on both surfaces thereof obtained as Reference Example 3 was cut into a 4.5 cm×4.5 cm (square) and one of the two release films was peeled off. MS—1002 (thermosetting liquid silicone product manufactured by Dow Corning Toray Co., Ltd.) hardened in a film shape with a 100 μm thickness was cut into a 4.5 cm×4.5 cm size (square) and the silicone rubber film was adhered to the sealing sheet 1 by hand. The resulting simple laminate body was placed in a vacuum laminating device (manufactured by Nikko Materials Co., Ltd. V-130). Lamination was performed for 30 seconds under conditions of vacuum setting value of 5.0 hPa and the temperature of the upper and lower heated plates in the reduced-pressure chamber at 110° C. Thereafter, the reduced pressure in the reduced-pressure chamber was canceled and returned to atmospheric pressure. Thus, a fully adhered laminate body with a (silicone rubber film—uncured silicone sealing layer 3—release film) structure was obtained.

The release film was peeled from the obtained laminate body and the sealing sheet 1 side thereof was adhered by hand to a 6.0 cm×6.0 cm (square) semiconductor substrate with a thickness of 0.2 mm (with a 35 μm copper foil pattern placed thereon). The resulting laminate body with a (silicone rubber film—uncured silicone sealing layer 1—semiconductor substrate) structure was placed in a vacuum laminator device (manufactured by Nikko Materials Co., Ltd. V-130). Lamination was performed for 30 seconds under conditions of vacuum setting value of 5.0 hPa and the temperature of the upper and lower heated plates in the reduced-pressure chamber at 110° C. Thereafter, the reduced pressure in the reduced-pressure chamber was canceled and returned to atmospheric pressure. Thus, a fully adhered laminate body with a (silicone rubber film—uncured silicone sealing layer 3—semiconductor substrate) structure was obtained. The laminate body obtained in this manner was placed in an oven set to 160° C. for two hours to thermally cure the uncured silicone sealing layer 1. The laminate body was removed from the oven to obtain laminate body 12 with a (silicone rubber (protective layer)—cured silicone sealing layer 3—semiconductor substrate) structure. The characteristics of the laminate body 12 are shown in Table 3.

Test Example X1

The curable hot melt silicone composition sheet (sealing sheet) 4 having release films on both surfaces thereof obtained as Reference Example 4 was cut into a 4.5 cm×4.5 cm (square) and one of the two release films was peeled off the sealing sheet 2. Thereafter, the surface of the sealing sheet 4 without the release film was overlaid on a semiconductor substrate (with a 35 μm thick copper foil pattern placed thereon) with a 6.0 cm×6.0 cm size and a thickness of 0.2 mm and the sealing sheet 2 was adhered to the semiconductor substrate by hand. The resulting laminate body with a (release film—uncured silicone sealing layer—semiconductor substrate) structure was placed in a vacuum laminator device (manufactured by Nikko Materials Co., Ltd. V-130). Lamination was performed for 30 seconds under conditions of vacuum setting value of 5.0 hPa and the temperature of the upper and lower heated plates in the reduced-pressure chamber at 110° C. Thereafter, the reduced pressure in the reduced-pressure chamber was canceled and returned to atmospheric pressure. Thus, a fully adhered laminate body with a (release film—uncured silicone sealing layer—semiconductor substrate) structure was obtained. Next, the laminate body obtained in this manner was placed in an oven set to 160° C. for two hours to thermally cure the curable silicone sealing layer. After removing the laminate body from the oven, the release film on the surface of the silicone sealing layer was peeled off to obtain laminate 13, with a (flat surface cured silicone sealing layer—semiconductor substrate) structure. The characteristics of the laminate body 4 are shown in Table 3.

Test Example X2

The curable hot melt silicone composition sheet (sealing sheet) 3 having release films on both surfaces thereof obtained as Reference Example 3 was cut into a 4.5 cm×4.5 cm (square) and one of the two release films was peeled off the sealing sheet 1. Thereafter, the surface of the sealing sheet 3 without the release film was overlaid on a semiconductor substrate (with a 35 μm thick copper foil pattern placed thereon) with a 6.0 cm×6.0 cm size and a thickness of 0.2 mm and the sealing sheet 1 was overlaid on the semiconductor substrate by hand. The resulting laminate body with a (release film—uncured silicone sealing layer—semiconductor substrate) structure was placed in a vacuum laminator device (manufactured by Nikko Materials Co., Ltd. V-130). Lamination was performed for 30 seconds under conditions of vacuum setting value of 5.0 hPa and the temperature of the upper and lower heated plates in the reduced-pressure chamber at 110° C. Thereafter, the reduced pressure in the reduced-pressure chamber was canceled and returned to atmospheric pressure. Thus, a fully adhered laminate body with a (release film—uncured silicone sealing layer—semiconductor substrate) structure was obtained. Next, the laminate body obtained in this manner was placed in an oven set to 160° C. for two hours to thermally cure the curable silicone sealing layer. After removing the laminate body from the oven, the release film on the surface of the silicone sealing layer was peeled off to obtain laminate 14, with a flat surface cured (silicone sealing layer—semiconductor substrate) structure. The characteristics of the laminate body 14 are shown in Table 3.

A schematic diagram of the laminate bodies of Examples 5 to 7 and Test Examples X1 and X2 is below. The laminate body includes a substrate, a lower layer (layer containing a cured product of a curable hot melt silicone composition) on the substrate, and a surface layer (functional layer) on the lower layer.

Formula 1

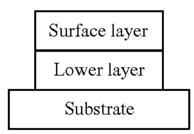

TABLE 3

| | Example 5 | Example 6 | Example 7 | Test Example X1 | Test Example X2 |
|---|---|---|---|---|---|
| | Laminate body 10 | Laminate body 11 | Laminate body 12 | Laminate body 13 | Laminate body 14 |
| Surface layer | Cured product including the curable silicone hot melt composition (2) | Polycarbonate Film | Silicone Rubber Film | — | — |
| Lower layer | Cured product including the curable silicone hot melt composition (1) | Cured product including the curable silicone hot melt composition (1) | Cured product including the curable silicone hot melt composition (1) | Cured product including the curable silicone hot melt composition (2) | Cured product including the curable silicone hot melt composition (1) |
| Surface roughness | ○ | ◎ | ○ | ○ | ○ |
| Surface tack | ○ | ○ | ○ | ○ | X |
| Thermal Cycle Durability | ◎ | ◎ | ◎ | X | ◎ |

From the results indicated in Table 1, use of a multilayer laminate structure including a curable hot melt silicone composition layer and a functional layer in contact with a surface of said layer in a non-restrictive example of the present invention enables obtaining a laminate body with reduced surface tack of the substrate silicone sealing layer, having the outer surface of the silicone sealing layer covered with a protective layer, and having a favorable thermal cycle durability.

DESCRIPTION OF THE REFERENCE NUMERALS

1: hot-melter
2: Extruder
3-*a*: Pump
3-*b*: Pump
3-*c*: Vacuum pump
4-*a*: Release sheet
4-*b*: Release sheet
5-*a*: Stretching roller (optionally further equipped with a temperature control function)
5-*b*: Stretching roller (optionally further equipped with a temperature control function)
6: Cooling roller
7: Film thickness meter
8: Sheet cutter
9: Foreign material inspecting machine

The invention claimed is:

1. A laminate body, comprising:

a base material; and a curable hot melt silicone composition layer in contact with the base material;

wherein the curable hot melt silicone composition includes an organopolysiloxane resin containing a siloxane unit selected from a group including a siloxane unit expressed by $R^1SiO_{3/2}$ where $R^1$ indicates an independent substituted or unsubstituted alkyl group or substituted or unsubstituted aryl group, and a siloxane unit expressed as $SiO_{4/2}$ making up at least 20 mol % or more of all siloxane units;

wherein the melt viscosity of the curable hot melt silicone composition as measured by a flow tester at a pressure of 2.5 MPa at 100° C. is 500 Pa·s or less;

wherein the curable hot melt silicone composition includes at least:

(A) an organopolysiloxane resin containing a siloxane unit expressed by $SiO_{4/2}$ making up at least 20 mol % or more of all siloxane units, and (B) a straight or branched chain organopolysiloxane that is liquid or has plasticity at 25° C.; and wherein component (A) comprises:

(A1') an organopolysiloxane resin containing a curing reactive functional group including a carbon-carbon double bond in the molecule and containing a siloxane unit expressed by $SiO_{4/2}$ making up at least 20 mol % of all siloxane units, that does not independently have hot-melt properties and is solid at 25° C.; and (A2') an organopolysiloxane resin that does not have a curing reactive functional group containing a carbon-carbon double bond in the molecule while containing a siloxane unit expressed by $SiO_{4/2}$ making up at least 20 mol % or more of all siloxane units, that does not independently have hot-melt characteristics and is solid at 25° C.

2. The laminate body according to claim 1, wherein the base material is a first base material, and the surface of the curable hot melt silicone composition layer on an opposite side of the surface in contact with the first base material is in contact with a second base material and the curable hot melt silicone composition layer is interposed between the first base material and the second base material.

3. The laminate body according to claim 1, wherein the curable hot melt silicone composition layer includes one or more layers, and when there are two or more layers, the compositions of the curable hot melt silicone compositions of each of the two or more layers are mutually different.

4. The laminate body according to claim 1, wherein the laminate body only includes one base material or the laminate body includes a first base material, a second base material, and a curable hot melt silicone composition layer interposed therebetween, one or both of the base materials is a substrate that is an electronic component or a semiconductor precursor.

5. The laminate body according to claim 4, wherein;

the laminate body includes the first base material, the second base material, and the curable hot melt silicone composition layer interposed therebetween, the first base material is an electronic component or a semiconductor precursor, and the second base material is a release film.

6. The laminate body according to claim 4, wherein;

the laminate body includes the first base material, the second base material, and the curable hot melt silicone composition layer interposed therebetween, the first base material and the second base material are both an electronic component or a semiconductor precursor.

7. The laminate body according to claim 1, wherein the $R^1$ of $R^1SiO_{3/2}$ is an aryl group.

8. The laminate body according to claim 1, wherein the melt viscosity of the curable hot melt silicone composition at a shear rate of $1s^{-1}$ and 100° C. is 5,000 Pa·s or lower and the melt viscosity as measured using a flow tester at 2.5 MPa and 100° C. is 140 Pa·s or lower.

9. The laminate body according to claim 1, wherein when cured, the curable hot melt silicone composition forms a cured product with a tan δ, which is the ratio of the storage elastic modulus and the loss elastic modulus, of 0.05 or more over a temperature range that spans over 100° C. or more within a range of −50° C. to 200° C.

10. The laminate body according to claim 1, wherein, when cured, the curable hot melt silicone composition forms a cured product with a shore A hardness of 40 or more.

11. The laminate body according to claim 1, manufactured using any one of manufacturing methods of compression molding, press molding, or vacuum lamination.

12. The laminate body according to claim 1, wherein the curable hot melt silicone composition is free of $M_4Q$ silicone, where M represents a $(R^1{}_3SiQ_{1/2})$ unit, Q represents a $(SiO_{4/2})$ unit, and $R^1$ indicates an independent substituted or unsubstituted alkyl group or substituted or unsubstituted aryl group.

13. The laminate body according to claim 1, including the multilayer laminate structure containing the curable hot melt silicone composition layer and a functional layer in contact with one of the surfaces of the curable hot melt silicone composition layer;

optionally, wherein the functional layer includes a curable hot melt silicone composition with a composition different from the curable hot melt silicone composition that enables imparting functionality that the composition included in the curable hot melt silicone composition layer or the cured product resulting therefrom does not have, to the multilayer laminate body or imparting functionality that is insufficient in the composition included in the curable hot melt silicone composition layer or the cured product resulting therefrom; and/or optionally, wherein the functional layer is a layer selected from a group including a layer containing a material with lower tack than the curable hot melt silicone composition, a layer containing a material with a higher elastic modulus than the cured product formed by curing the curable hot melt silicone composition, a layer containing a curable material with an elastic modulus that will be higher than that of the cured product formed by curing the curable hot melt silicone composition, a layer containing a material having water repellency and/or oil repellency, and an optical functional layer.

14. A peelable laminate body, comprising:

a multilayer laminate structure including the curable hot melt silicone composition layer according to claim 13 and the functional layer in contact with a surface of the layer;

wherein the multilayer laminate structure is further provided with a release film or protective film adhered to one of either of the two outermost surfaces thereof.

15. A laminate body, comprising:

a multilayer laminate structure including the curable hot melt silicone composition layer according to claim 13 and the functional layer in contact with a surface of the layer;

wherein the structure of the laminate body is provided with a base material without peeling properties laminated on the surface of the curable hot melt silicone composition layer that is not in contact with the functional layer.

16. A laminate body, comprising a cured silicone layer obtained from curing the curable hot melt silicone composition contained in the laminate body according to claim 1, optionally wherein the laminate body is an electronic component.

17. A laminate body including one base material and a curable hot melt silicone composition layer in contact with the base material according to claim 1, manufactured using a method including the following steps:

1 arranging a sheet or film containing the curable hot melt silicone composition in a reduced-pressure chamber with respect to the base material arranged in the chamber such that the sheet or film can be caused to come into contact with the base material in a subsequent step; a step in a reduced-pressure chamber of placing a sheet or film containing the curable hot melt silicone composition on the base material arranged in the chamber; or a step of setting the base material with a sheet or film containing the curable hot melt silicone composition placed so as to contact the base material beforehand in a reduced-pressure chamber;

2 depressurizing in the reduced-pressure chamber to a prescribed pressure;

3 heating inside the reduced-pressure chamber at reduced pressure to melt the curable hot melt silicone composition sheet or film and adhere it to the base material and, as needed, press one or both of the base material and sheet or film, after adhering, to pressure bond the curable hot melt silicone composition sheet or film to the base material; and 4 canceling the pressure reduction inside the reduced-pressure chamber and removing the laminate body including a layer containing the curable hot melt silicone composition, a cured layer thereof, a layer selected from a group containing half-cured layers, and the base material in contact with this layer from the chamber.

18. A laminate body having a structure of two of the same or different base materials with the curable hot melt silicone composition layer interposed therebetween, obtained according to the method of claim 17, wherein having a sheet or film containing the curable hot melt silicone composition arranged to enable coming into contact with the base material in a subsequent step or that is placed on the substrate beforehand, regarding the surface other than the surface that will come into contact with the base material at a subsequent step or the surface in contact with the base material, a base material that is the same or different from the base material is arranged so as to enable coming into contact with the sheet or film containing the curable hot melt silicone composition at a subsequent step or regarding this other surface, a base material that is the same or different from the base material is placed in contact with the sheet or film containing the curable hot melt silicone composition beforehand.

19. The laminate body obtained according to the method of claim 17, including:

two of the same or different base materials with a the curable hot melt silicone composition layer interposed therebetween manufactured by;

laminating the curable hot melt silicone composition layer derived from a sheet or film containing the curable hot melt silicone layer on one surface of the base material, and similar to steps 1) to 4), laminating the same or different base material as the base material onto the outer surface of the side of the base material not in contact with the curable hot melt silicone composition layer.

20. The laminate body obtained according to the method of claim 17, wherein the temperature for pressure bonding the curable hot melt silicone composition sheet or film to the base material is 50° C. or higher.

* * * * *